United States Patent
Villeminey

(10) Patent No.: US 7,753,429 B2
(45) Date of Patent: Jul. 13, 2010

(54) ADJUSTABLE VEHICLE SEAT

(75) Inventor: Jean-Paul Villeminey, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 31 days.

(21) Appl. No.: 12/051,363

(22) Filed: Mar. 19, 2008

(65) Prior Publication Data

US 2009/0236880 A1 Sep. 24, 2009

(51) Int. Cl.
*B60N 2/02* (2006.01)
(52) U.S. Cl. .............. 296/65.16; 296/65.05; 296/67; 297/188.1; 297/188.04; 297/340
(58) Field of Classification Search .......... 297/188.1, 297/34, 188.04, 188.06, 15, 340, 344.1, 378.1; 296/37.15, 37.8, 37.16, 64, 65.13, 65.16, 296/67, 65.05; 224/275
See application file for complete search history.

(56) References Cited

U.S. PATENT DOCUMENTS

| | | | | |
|---|---|---|---|---|
| 4,779,832 A * | 10/1988 | Rees | .......................... | 248/421 |
| 5,415,457 A * | 5/1995 | Kifer | ..................... | 297/188.04 |
| 5,716,091 A * | 2/1998 | Wieczorek | ............... | 296/37.16 |
| 5,848,820 A * | 12/1998 | Hecht et al. | ............... | 297/188.1 |
| 5,927,789 A * | 7/1999 | Mezzadri et al. | ............... | 296/64 |
| 6,502,900 B1 * | 1/2003 | Johnston | ................. | 297/188.06 |
| 6,648,395 B2 * | 11/2003 | Hoshino | ....................... | 296/66 |
| 7,066,539 B2 * | 6/2006 | Hatta et al. | ............. | 297/344.14 |
| 2002/0145314 A1 * | 10/2002 | Kucera | ................... | 297/188.06 |
| 2005/0248189 A1 * | 11/2005 | Prasatek et al. | ......... | 297/188.04 |
| 2006/0220411 A1 * | 10/2006 | Pathak et al. | ............. | 296/65.11 |
| 2007/0182231 A1 * | 8/2007 | Lutzka et al. | ........... | 297/378.12 |

* cited by examiner

*Primary Examiner*—Glenn Dayoan
*Assistant Examiner*—SunSurraye Westbrook
(74) *Attorney, Agent, or Firm*—Quinn Law Group, PLLC

(57) ABSTRACT

A seat assembly is provided for use in a vehicle interior, and includes a frame and lower and upper bracket assemblies. The lower bracket assembly is connected to a lower portion of the frame, and selectively moves the frame in a longitudinal direction with respect to the vehicle interior. The upper bracket assembly is connected to an upper portion of the frame, and has a slot which receives a selector pin for selectively pivoting the upper portion of the frame with respect to the lower portion of the frame. A moveable linkage is connected to the upper bracket assembly and moves the selector pin for adjusting between different passenger seating positions. An adjustment mechanism includes a lever for moving the moveable linkage via a cable. The seat assembly can include a deployable storage bin positioned between the bulkhead and a seat surface.

16 Claims, 4 Drawing Sheets

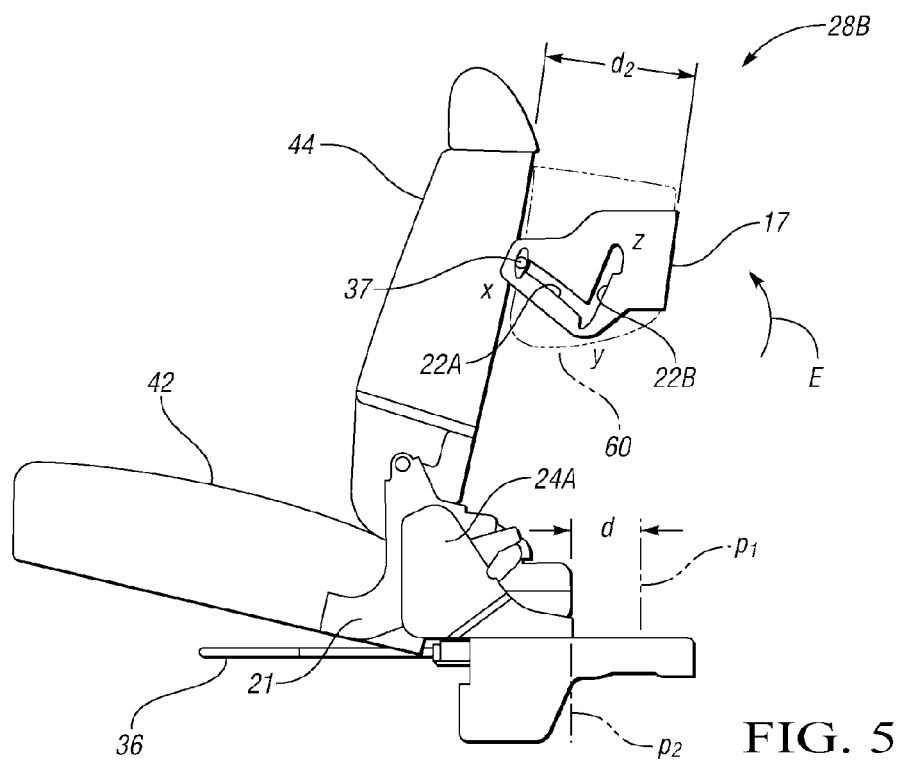
FIG. 5
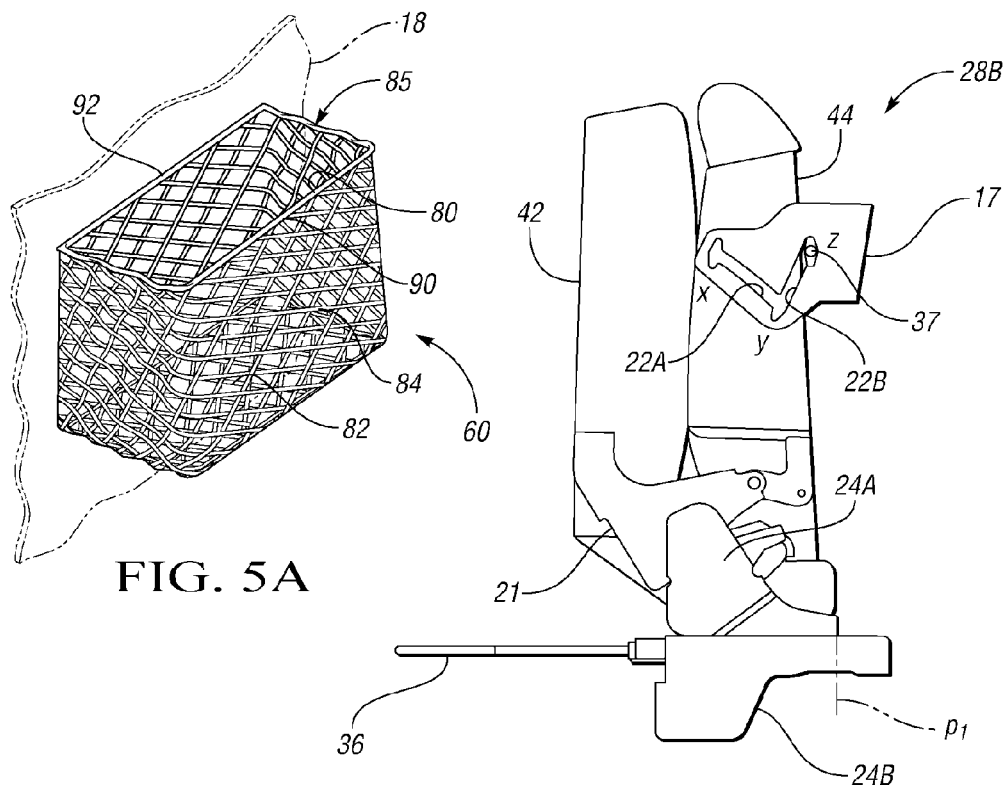
FIG. 5A
FIG. 6

ADJUSTABLE VEHICLE SEAT

TECHNICAL FIELD

The present invention relates generally to an adjustable vehicle seat, and in particular to an adjustable vehicle seat configured for use as a rearmost row of seats in a vehicle interior having a bulkhead.

BACKGROUND OF THE INVENTION

Modern vehicles typically provide at least one row of rear seats for conveying passengers within the vehicle interior. Rear rows of seats may be configured as a traditional bench-style seat, or may include individual bucket seats that are selectively adjustable as desired in order to provide customized seat positioning. Pickup truck-style vehicles and other vehicle styles having a cargo bed or a rear cargo area typically separate the rear cargo area from the vehicle interior or "crew cab" by an interior wall or bulkhead.

The rearmost row of seats, which can be configured as a split bench-style seat such as a 60-40 seat, is the row of seats positioned immediately adjacent to the bulkhead. The seats are rigidly connected to the bulkhead, as well as to the sides or C-pillars of the vehicle interior. However, the number of available seating positions provided by a typical rearmost row of seats is generally limited. In particular, one or both of the split bench or 60-40 seats can be folded into an upright position and stowed against the bulkhead in order to increase cargo capacity within the vehicle interior, with the available seating positions generally being limited to a single position, potentially making the rearmost row of seats less than optimal for certain purposes.

SUMMARY OF THE INVENTION

Accordingly, an adjustable seat is provided for use within a vehicle interior. The seat may be configured as a rearmost seat for use within a pickup truck crew cab or interior, for example, or within another vehicle having a bulkhead separating the passenger compartment of the vehicle from a rear cargo area. As used herein, the term "rear seat" refers to a vehicle seat that is positioned immediately adjacent to the bulkhead, and therefore could be either a second or a third row of seats depending on the design of the vehicle. The adjustable seat provides for a plurality of different passenger positions, as well as a stowed or upright position corresponding to the folded or stowed position discussed above. The passenger positions vary from one another in forward travel and/or seating angle. In one embodiment, a deployable storage bin is also provided between the bulkhead and the adjustable seat, with the storage bin being accessible only when the seat is positioned in a particular one of the available positions or configurations.

The row of seats, hereinafter referred to as a seat assembly, includes an upper bracket which is connected to a frame, and which is configured as a pair of intersecting grooves forming a generally V-shaped groove having three fixed "stops" or ends, each forming a different locking position. A selector pin moves between the three fixed stops or ends to selectively recline the seat assembly. A lower bracket provides the seat with a predetermined amount of forward and rearward travel, i.e., a range of motion in a longitudinal direction with respect to the vehicle interior. The seat assembly can be positioned at one of a plurality of different seating positions by selectively moving the selector pin between the three fixed stops or ends, and by moving the seat assembly in a longitudinal direction along a portion of the lower bracket, to provide a desired amount of forward travel.

In one embodiment, the selector pin is connected to an adjustment lever via a moveable linkage. A force exerted on the lever moves the linkage, which ultimately retracts the selector pin so that the frame is free to pivot or move with respect to the upper bracket. Likewise, the force exerted on the lever allows the frame to move along the lower bracket, thus providing the desired amount of forward or rearward travel.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic side view of the seat assembly of FIG. 1 configured in a third or "forward" position;

FIG. 5A is a perspective view of a deployable storage bin usable with the seat assembly of FIG. 1; and FIG. 6 is a schematic side view of the seat assembly configured in a fourth or "stowed" position.

DESCRIPTION OF THE PREFERRED EMBODIMENTS

Figure 1:
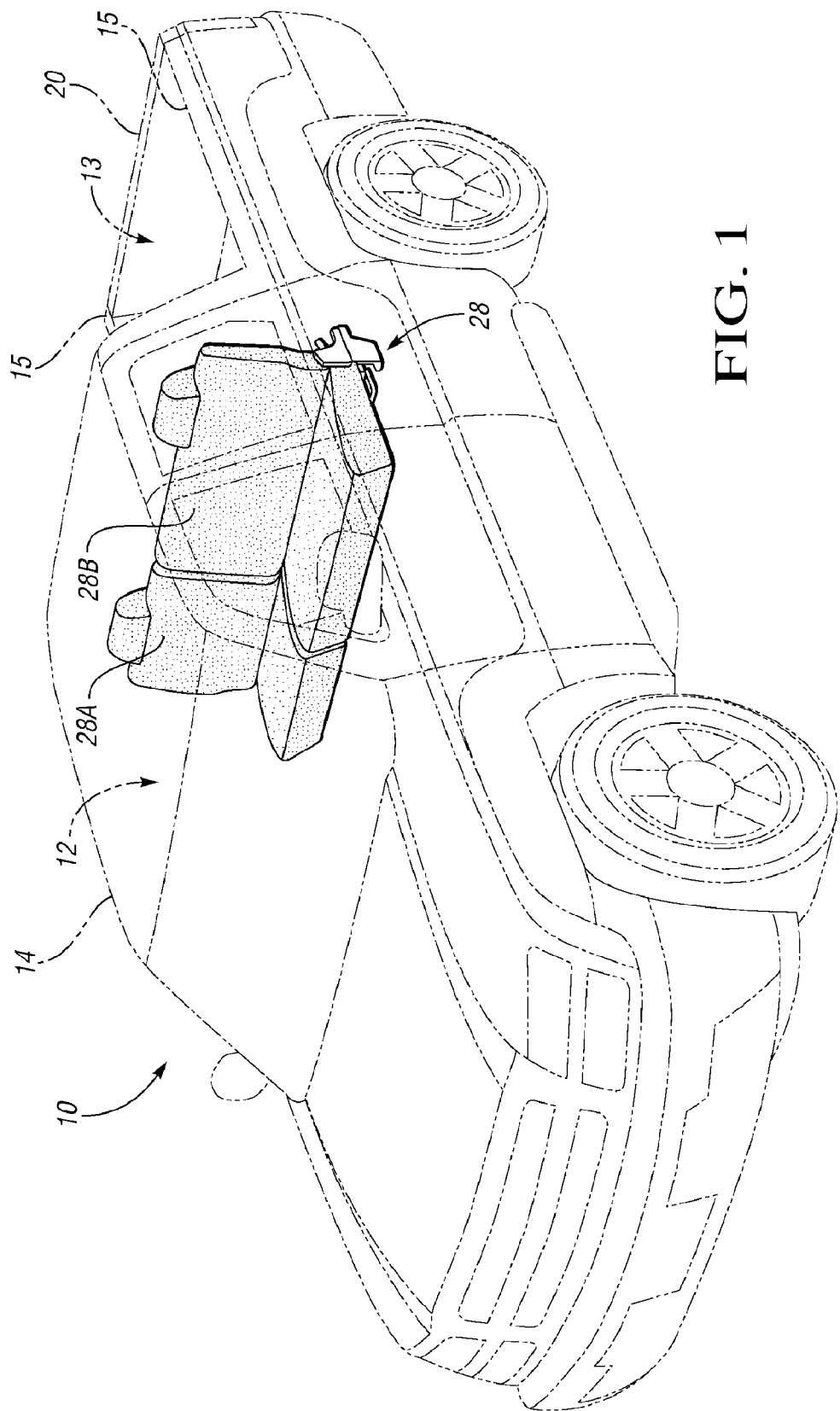
FIG. 1 is a schematic perspective side view of a vehicle having an adjustable seat assembly.

Referring to the drawings, wherein like reference numbers correspond to like or similar components throughout the several figures, and beginning with FIG. 1, a vehicle 10 includes a vehicle body 14 defining a passenger compartment, crew cab, or interior 12. In the embodiment depicted in FIG. 1, the vehicle body 14 is configured in the style of a pickup truck, and therefore includes two cargo box sidewalls 15 and a tailgate door 20, with the sidewalls 15 and the tailgate door 20 cooperating to at least partially define a cargo bed or cargo area 13. Within the scope of the invention, however, other vehicle body styles may be used, such as a sport utility vehicle (SUV) or any other design having a cargo area 13 which is separated from the interior 12 by an interior wall or bulkhead 18 (see FIG. 2).

The interior 12 also includes an adjustable seat assembly 28, which is selectively adjustable or repositionable to achieve various fixed seating positions and a stowed position, as will be explained below with reference to FIGS. 3 through 6. In the embodiment shown in FIG. 1, the seat assembly 28 is configured as a 60-40 split-bench seat assembly, and therefore includes a first adjustable seat assembly 28A and a second adjustable seat assembly 28B, each being independently moveable and/or repositionable as desired by an occupant. However, a 60-40 design is only one way in which the seat assembly 28 may be configured, and those of ordinary skill of the art will recognize that different configurations, such as a single seat, a 50-50 split bench, bucket seats, or another seating design may be used within the scope of the invention, depending on the design of the interior 12.

Figure 2:
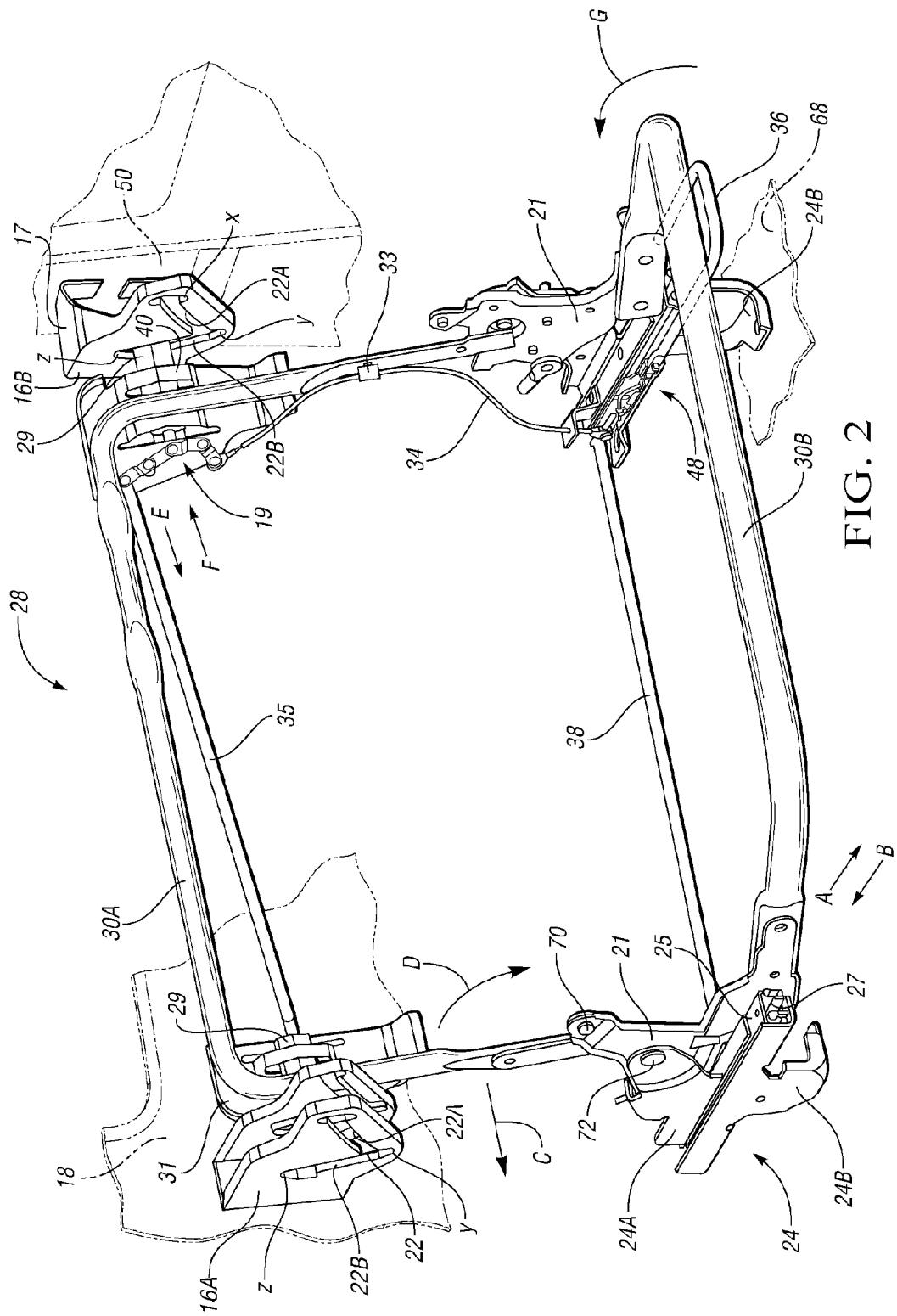
FIG. 2 is a schematic perspective front view of a portion of the seat assembly of FIG. 1.

Referring to FIG. 2, the seat assembly 28 is shown with an upper or back cushion 44 and a lower or seat cushion 42 (see FIGS. 3-6) removed for clarity. The seat assembly 28 includes a generally L-shaped frame 30 having an upper portion 30A and a lower portion 30B. The frame 30 may be constructed of solid or tubular steel, composite, and/or other material suitable as a structural support for the seat assembly 28. While the seat assembly 28B (see FIG. 1) will be used as the exemplary seat when referring to the seat assembly 28 generally hereinafter, the first adjustable seat 28A (see FIG. 1) may also be configured in a like manner so that each of the respective first and second seat assemblies 28A, 28B may be independently adjusted.

The upper frame portion 30A is connected to the lower frame portion 30B by a pair of lower bracket assemblies 24, which are configured or adapted for allowing the upper frame portion 30A to pivot and/or rotate with respect to the lower frame portion 30B to select a desired seating angle, as well as to allow the seat assembly 28 to slide or move in a forward longitudinal direction (arrow A) and a rearward longitudinal direction (arrow B) within the interior 12 (see FIG. 1) as desired. The upper frame portion 30A is connected to an upper bracket 16A, which in turn is rigidly connected to a stationary surface of the interior 12 (see FIG. 1), such as to the bulkhead 18. The upper frame portion 30A is also connected to a substantially similarly configured upper bracket 16B, which differs from bracket 16A in that it includes a connection portion 17 or other suitably sized and/or shaped mounting feature which allows the upper bracket 16B to be rigidly connected to a side or C-pillar 50 within the interior 12 (see FIG. 1). The upper brackets 16A, 16B are conjoined or interconnected via a common moveable linkage 35, which will be described below.

To enable movement of the seat assembly 28 in the longitudinal direction (arrow A), also referred to hereinafter as "forward travel", the lower bracket assembly 24 is split, bisected, or divided into two mating portions, including a moveable top portion 24A and a fixed bottom portion 24B. The fixed bottom portion 24B is held stationary, i.e., is fixed, such as by rigidly fastening the fixed bottom portion 24B to a floor 68 of the interior 12 (see FIG. 1) using a number of threaded bolts (not shown). The moveable top portion 24A can be formed integrally with, or operatively connected to, an upper track or rail 25 or other suitable device, with the fixed lower portion 24B being formed integrally with, or operatively connected to, a mating track or lower rail 27, or other suitable device. In this manner, the moveable top portion 24A is allowed to slide or otherwise move in a forward longitudinal direction (arrow A), and in a rearward longitudinal direction (arrow B), as desired. The moveable top portion 24A can be selectively unlatched from the fixed bottom portion 24B so as to move freely in the directions of arrows A or B by exerting a force in the direction of arrow A on a handle 36 in the conventional manner of manually adjustable seats, while such a force simultaneously move a moveable linkage 35 as described below, enabling repositioning of the seat assembly 28.

The lower bracket assembly 24 is formed integrally with or operatively connected to a hinged side bracket 21, with the hinged side bracket 21 being connected to the upper frame portion 30A, or to an extension thereof, via a hinge device or pivot 70. For example, the pivot 70 may be a captive rivet or any other suitable device allowing the upper frame portion 30A to rotate about or around the pivot 70 in the direction of arrow C in order to selectively recline the seat assembly 28 (see FIGS. 1 and 4), and in the direction of arrow D to selectively return the seat assembly 28 to a more upright or "normal" position (see FIGS. 3 and 5). Finally, the seat cushion 42 (see FIGS. 3-6) of the seat assembly 28 may be pivoted about another pivot 72 in the direction of arrow G, so as to place the seat assembly 28 in a "stowed" position (see FIG. 6).

Still referring to FIG. 2, and also shown in FIGS. 3-6, the upper bracket assemblies 16A and 16B include a track or slot 22, which includes a first slot 22A and a second slot 22B. The slots 22A, 22B are arranged in a substantially orthogonal manner to form a generally V-shape slot pattern. The first slot 22A has a pair of identical stops or ends X and Y, which are shaped and/or sized to provide a pair fixed seating positions, as will be described hereinbelow. The second slot 22B likewise has a pair of identical stops or ends Y and Z, with the first and second slots 22A, 22B intersecting at a common end, i.e., the end Y.

As shown in FIG. 2, the seat assembly 28 includes an adjustment mechanism 48 for moving an actuating mechanism 19, which is directly interconnected to the moveable linkage 35, such as a rigid arm, lever, or other suitable device, via a length of cable 34. The cable 34 is retained or secured to the upper frame portion 30A via a retaining clip 33, a strap (not shown), or other suitable retention device. The adjustment mechanism 48 has a conveniently-positioned device, such as the handle 36 discussed above, which is operatively connected to the cable 34. When a force is applied in the direction of arrow A to the handle 36, in addition to unlatching the moveable top portion 24A of the lower bracket assembly 24, tension on the cable 34 from the handle 36 retracts, pulls, or otherwise moves the linkage 35 via the actuator mechanism 19 in the direction of arrow F. When the handle 36 is subsequently released, the linkage 35 is free to move in the direction of arrow E. As shown in FIG. 2, the actuator mechanism 19 is a suitable length of segments or links, such that tension of the cable 34 moves the substantially rigid linkage 35 as desired. However, other devices may be used in place of the actuator mechanisms 19 and/or linkage 35 within the scope of the invention, provided a forced applied to the handle 36 moves the linkage 35 in the manner described below.

The linkage 35 is formed integrally with or connected to a slide piece 29, which can be supported and/or retained with respect to the bulkhead 18 by a bracket 31 having ribs 40 or other suitably shaped device. The slide piece 29 includes a selector pin 37 (see FIGS. 3-6), which slides or moves between the various ends X, Y, and Z within the slot 22, including any position therebetween, to thereby position the seat assembly 28 to one of a plurality of different seating positions, as will now be described with reference to FIGS. 3-6.

Figure 3:
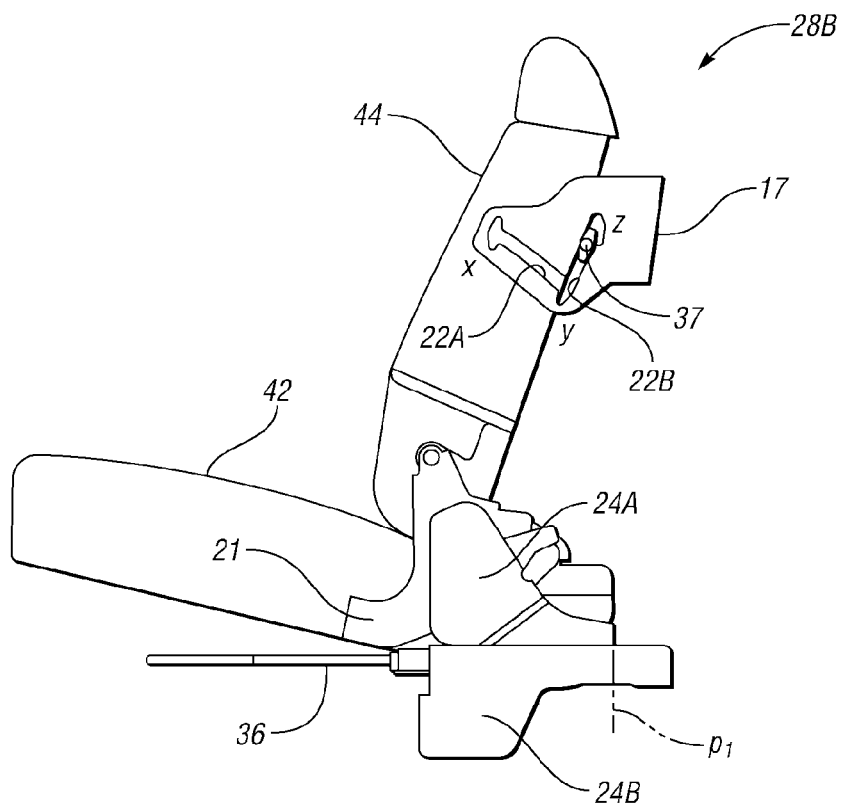
FIG. 3 is a schematic side view of the seat assembly of FIG. 1 configured in a first or "normal" position.

Referring to FIG. 3, the seat assembly 28 is configured in a first fixed seating position, referred to hereinafter as "upright normal". In this position, the selector pin 37 is positioned at end Z and the top portion 24A of the lower bracket 24 is in its rearmost position, represented as the position $p_1$. To position the seat assembly 28 from the upright normal position of FIG. 3 to a "reclined" position (see FIG. 4), an occupant of the seat assembly 28 may pull on the handle 36 to thereby retract the selector pin 37 via the cable 34, the actuator device 19, and the linkage 35 (see FIG. 2) as discussed above, and then may slide the seat cushion 42 of the seat assembly 28 in the direction of arrow A, such as by pulling against the floor 68 (see FIG. 1) or a door handle (not shown) in the conventional manner of a manually-adjustable vehicle seat.

Figure 4:
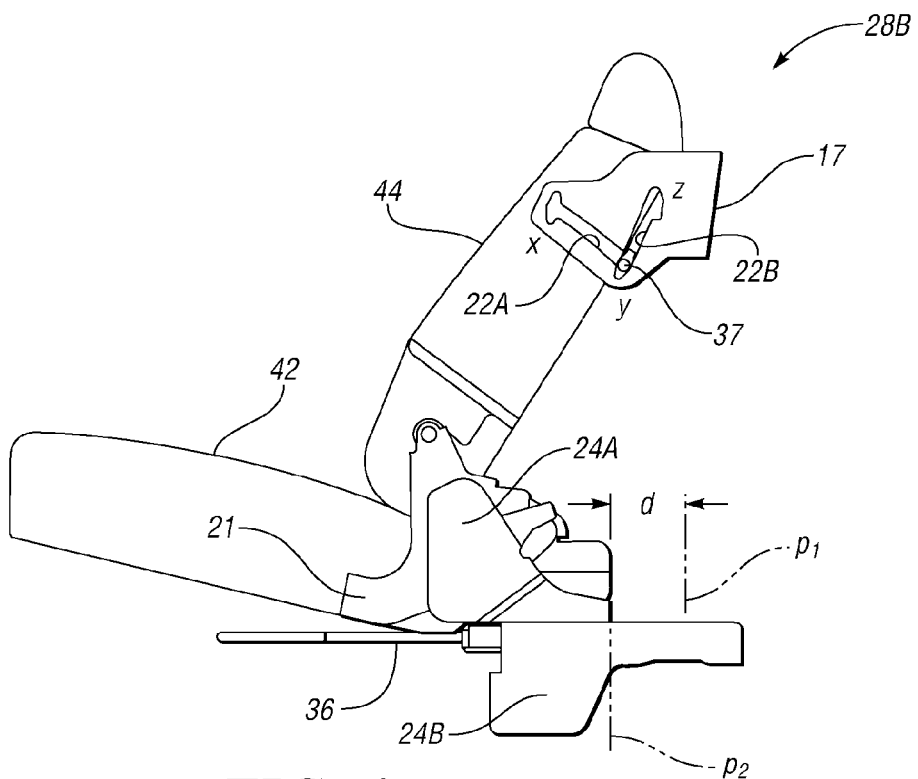
FIG. 4 is a schematic side view of the seat assembly of FIG. 1 configured in a second or "reclined" position.

Referring to FIG. 4, the "reclined" position is achieved when the selector pin reaches common end Y, and when the handle 36 is subsequently released. The selector pin 37 then locks into the end Y. In the position of FIG. 4, the seat assembly 28 is moved to the position $p_2$, and therefore has an amount of forward travel d, with the top portion 24A of the lower bracket positioned to its forward-most limit. In one embodiment, the maximum forward travel d is approximately 80 to 90 millimeters, however those of ordinary skill in the art will recognize that other maximum forward travel distances may be used within the scope of the invention as determined by the configuration or design of the lower bracket assembly 24.

Referring to FIG. 5, the "forward normal" position is achieved when the selector pin 37 is locked into the end X of the slot 22B. In the forward normal position, with the seat assembly 28 still at position $p_2$, the seat assembly 28 retains the amount of forward travel (d) discussed above with reference to FIG. 4, i.e., with the top portion 24A of the lower bracket positioned to its forward-most limit. Such a position may be used, for example, to provide access to an optional deployable storage bin 60, as shown in phantom in FIG. 5.

Referring to FIG. 5A, such a storage bin 60 may be configured as a flexible and/or collapsible pocket, bag, pouch, compartment, or other bin having sides 84 defining a top opening 80, and a bottom 82 connected to or formed integrally with the sides 84. A rear surface 92 may be connected to the bulkhead 18, with an opposite or forward surface 90 being connected to the upper or back cushion 44 (see FIG. 5), such that when the seat assembly 28 is placed into the "forward normal" position of FIG. 5, the storage bin 60 is pulled or moved into a fully open position. Likewise, when the seat assembly 28 is placed in the "normal" position of FIG. 3 or the "forward reclined" position of FIG. 4 discussed above, the storage bin 60 collapses. The sides 84 may be constructed of any flexible or semi-flexible material, such as netting 85 as shown, or vinyl, leather, and/or corrugated plastic, or another suitable flexible material.

Referring to FIG. 6, the seat assembly 28 is configured in an "upright stowed" position, i.e., with the seat cushion 42 flipped or rotated against the back cushion 44. In this position, the selector pin 37 is positioned at end Z and the top portion 24A of the lower bracket 24 is in its rearmost position, represented as $p_1$. Space is increased within the interior 12 (see FIG. 1), providing additional capacity when the seat assembly 28 is not required for a passenger.

While the best modes for carrying out the invention have been described in detail, those familiar with the art to which this invention relates will recognize various alternative designs and embodiments for practicing the invention within the scope of the appended claims.

The invention claimed is:

1. A seat assembly having a back cushion and a seat cushion for use in a vehicle interior having a bulkhead, the seat assembly being positioned immediately adjacent to the bulkhead and comprising:
   an L-shaped frame having an upper portion supporting the back cushion and a lower portion supporting the seat cushion;
   a lower bracket assembly connected to the lower portion of the frame, and configured for selectively moving the frame in a longitudinal direction with respect to the vehicle interior;
   an upper bracket assembly connected to the upper portion of the frame and rigidly connected to the bulkhead, and configured for selectively rotating the upper portion of the frame with respect to the lower portion of the frame, the upper bracket assembly defining a slot;
   a selector pin selectively moveable within the slot;
   an adjustment mechanism having a handle; and
   a moveable linkage operably connected to the selector pin and to the handle, the moveable linkage being adapted for moving the selector pin in response to a movement of the handle to thereby adjust the frame between a plurality of different passenger seating positions.

2. The seat assembly of claim 1, wherein the slot has a plurality of fixed stop positions each corresponding to different ones of the plurality of different passenger seating positions.

3. The seat assembly of claim 1, wherein the lower bracket assembly includes a fixed bottom portion that is rigidly attached to a floor of the vehicle interior, and a moveable top portion connected to the lower portion of the frame, the moveable top portion being slidingly connected to the fixed bottom portion.

4. The seat assembly of claim 1, further comprising a deployable storage bin;
   wherein the deployable storage bin is connected to the frame, and is accessible only when the frame is moved to a first one of the plurality of different passenger seating positions.

5. The seat assembly of claim 2, wherein the handle is operatively connected to a cable, and wherein a force exerted on the handle moves the cable, thereby moving the moveable linkage.

6. The seat assembly of claim 1, wherein the slot has a first, a second, and a third fixed position, and wherein a movement of the moveable linkage in one direction retracts the selector pin from one of the fixed positions, and wherein a movement of the moveable linkage in another direction extends the selector pin into one of the fixed positions.

7. The seat assembly of claim 1, wherein the lower bracket assembly is configured to allow the frame to move approximately 80 to 90 millimeters in the longitudinal direction.

8. A vehicle interior comprising:
   a bulkhead;
   a rear row of seats positioned immediately adjacent to the bulkhead;
   an L-shaped frame having an upper portion for supporting a back cushion and a lower portion for supporting a seat cushion;
   a pair of lower bracket assemblies each configured for selectively positioning the L-shaped frame in a longitudinal direction with respect to the vehicle interior;
   a pair of conjoined upper bracket assemblies operatively connected to the upper portion of the L-shaped frame, and configured for selectively pivoting the upper portion with respect to the lower portion, wherein at least one of the pair of conjoined upper brackets is fastened to the bulkhead and defines a slot;
   an adjustment handle;
   a selector pin which is selectively moveable within the slot; and
   a moveable linkage operatively connected to the selector pin and to the adjustment lever;
   wherein a force exerted on the adjustment handle moves the linkage and the selector pin to enable the selector pin to move within the slot, thereby allowing an adjustment of the L-shaped frame between at least three different fixed seating positions and a stowed position.

9. The vehicle interior of claim 8, wherein the slot has three fixed stop positions each corresponding to a different one of the at least three different fixed seating positions.

10. The vehicle interior of claim 8, wherein each of the pair of lower bracket assemblies includes a moveable top portion and a fixed bottom portion, the moveable top portion being selectively moveable a predetermined maximum distance with respect to the fixed bottom portion for the adjustment of the L-shaped frame.

11. The vehicle interior of claim 10, wherein the predetermined maximum distance is approximately 80 to 90 millimeters.

12. The vehicle interior of claim 8, including a deployable storage bin positioned between and connected to each of the bulkhead and a surface of the rear row of seats.

13. An adjustable seat assembly for a vehicle interior comprising:
 a frame having a first portion and a second portion;
 a first bracket having a generally V-shaped slot providing a first, a second, and a third fixed seating position, the first bracket being rigidly connected to the first portion of the frame and a stationary surface of the vehicle interior;
 a second bracket having a moveable top portion and a fixed bottom portion, the moveable top portion being slidably movable along the fixed bottom portion to provide the frame with a predetermined amount of forward travel; and
 a retractable selector pin that is slidably moveable within the slot of the first bracket as the first portion of the frame pivots with respect to the second portion of the frame;
 wherein pivoting of the first portion of the frame between a first seating position and a second seating position moves the moveable top portion of the second bracket with respect to the fixed bottom portion.

14. The adjustable seat of claim 13, wherein the adjustable seat assembly is configured as a 60-40 seat.

15. The adjustable seat of claim 13, wherein the first fixed seating position establishes a substantially vertical first frame portion without the predetermined amount of forward travel, the second fixed seating position establishes a reclined first frame portion with the predetermined amount of forward travel, and the third fixed seating position establishes a substantially vertical first frame portion with the predetermined amount of forward travel.

16. The adjustable seat of claim 15, including a deployable storage bin, wherein the third fixed position provides access to the deployable storage bin.

* * * * *